Sept. 12, 1950     H. J. LOFTIS     2,522,231
SEALING MEANS FOR MOVING SHAFTS
Filed May 8, 1945     2 Sheets-Sheet 1
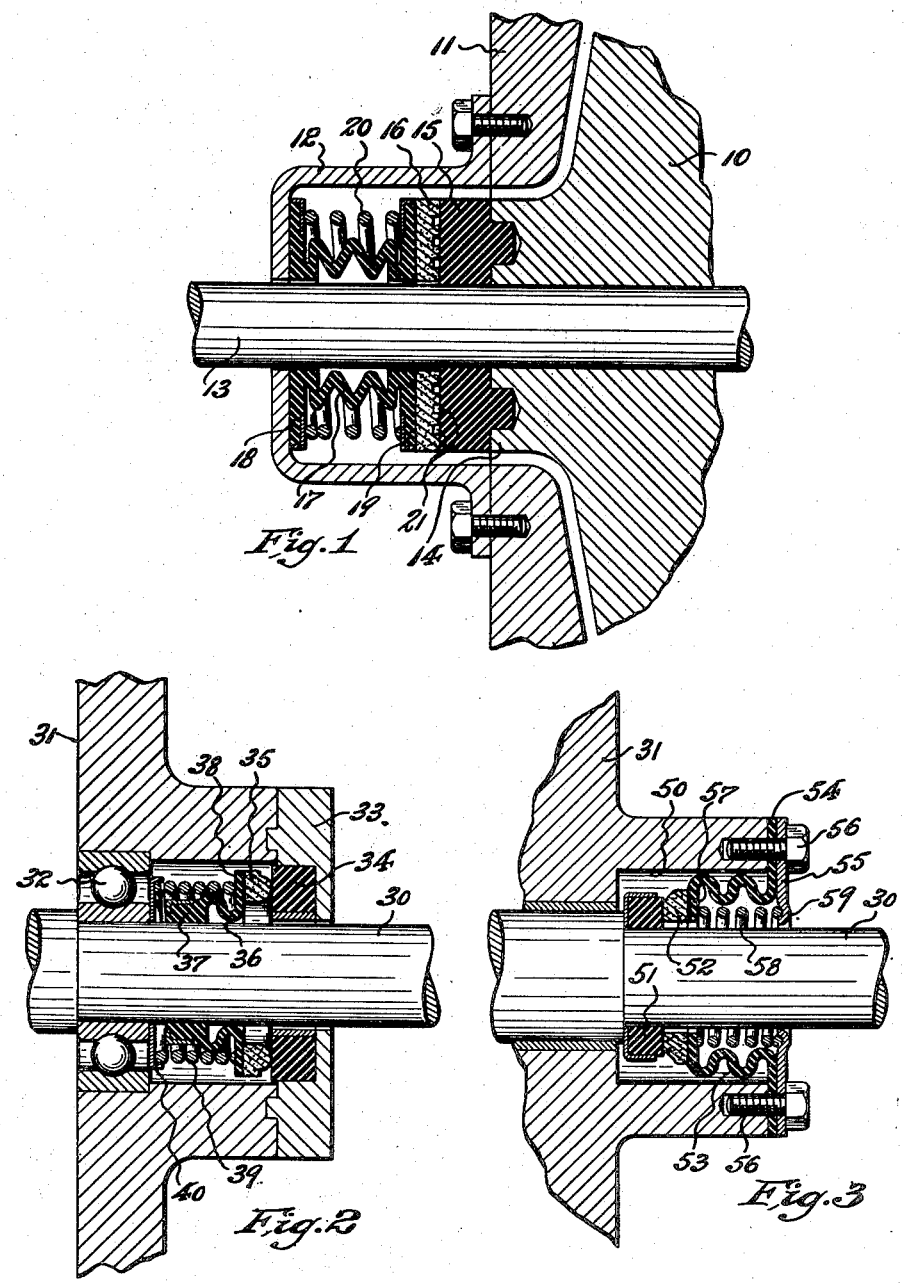
INVENTOR.
Homer J. Loftis,
BY George D. Richards
Attorney Sept. 12, 1950          H. J. LOFTIS          2,522,231
SEALING MEANS FOR MOVING SHAFTS
Filed May 8, 1945          2 Sheets-Sheet 2
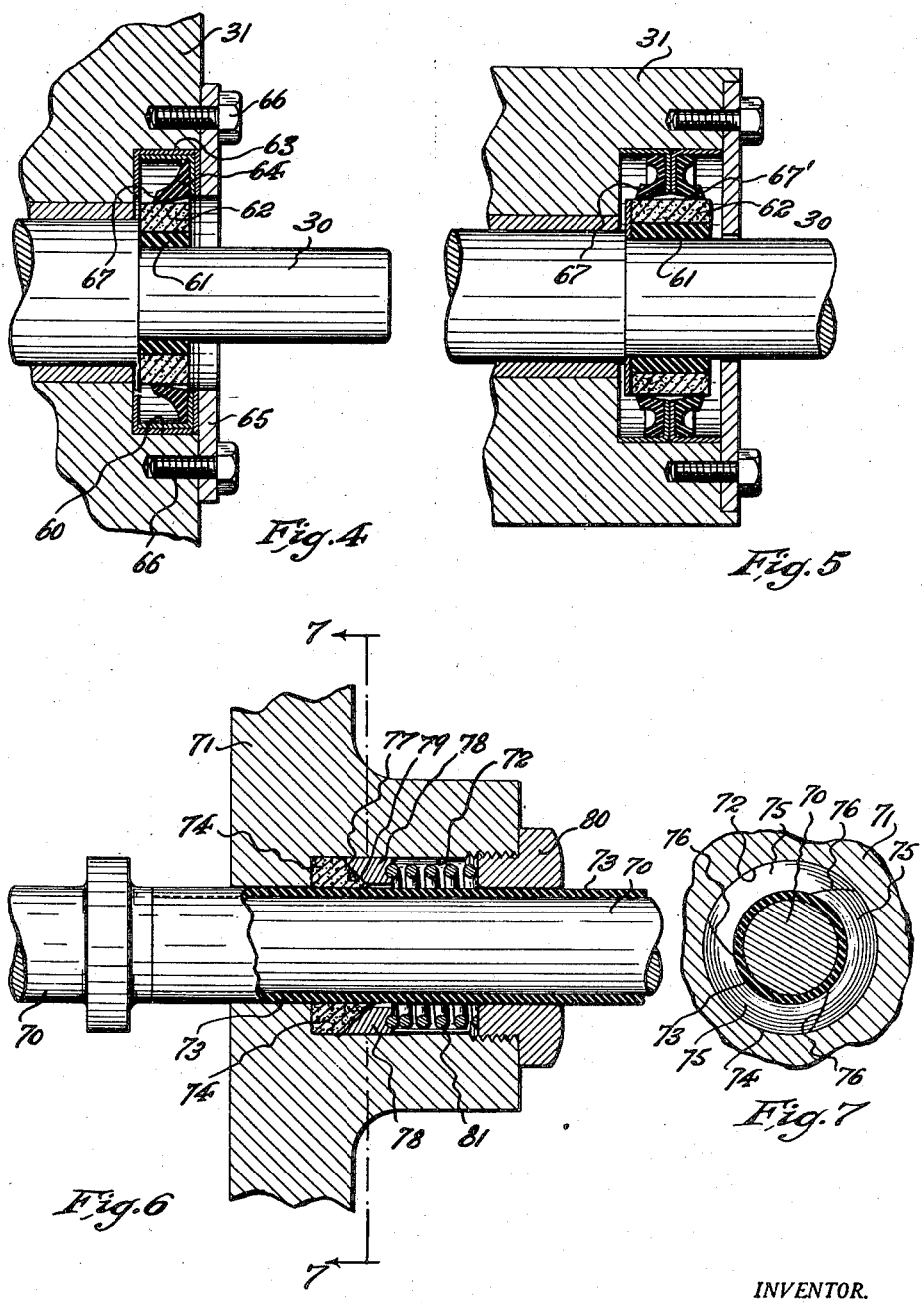

Patented Sept. 12, 1950

2,522,231

UNITED STATES PATENT OFFICE 2,522,231

SEALING MEANS FOR MOVING SHAFTS

Homer J. Loftis, Ironton, Ohio, assignor to Henrite Products Corporation, Ironton, Ohio, a corporation of Ohio Application May 8, 1945, Serial No. 592,695

3 Claims. (Cl. 286—11)

This invention relates to improvements in fluid seals for moving shafts or the like of either the rotating or sliding type.

Fluid seals for moving shafts or the like, as heretofore commonly known and used, are generally of two types; one wherein the sealing joint is formed by the rubbing juncture of two rigid materials, such e. g. as metal to metal or metal to carbon; and the other wherein the sealing joint is effected by contact of flexible material, such as rubber, leather or the like, directly with the moving shaft or a part moving with the latter.

In fluid seals of the first mentioned type, the meeting or sealing surfaces must be machined, ground and lapped to very precise flat planes (commonly referred to as optical flats) in order to obtain a fluid tight joint or seal effective against liquids and gases. Seals of such type are quite satisfactory in function, especially against oils and other liquids having a lubricating effect, provided sufficient leakage is allowed for to permit conduct of some liquid to and between the meeting surfaces of the rubbing materials comprising the same, whereby to lubricate such surfaces, but manufacture of such seals, particularly when the seals must respond to exacting requirements, involves much labor and precision work and hence such seals are very expensive and often prohibitive and impractical.

Fluid seals of the second mentioned type, while adapted for use under less exacting conditions, nevertheless since the element thereof formed from flexible material, such as leather, rubber or other elastomers, possesses a high coefficient of friction when rubbing against a dry metallic surface, it will heat rapidly with risk of charring or other deterioration, occurrence of which soon causes break down and loss of sealing effect, so that here again the flexible material must be either saturated with lubricant or lubricant must be furnished thereto by permitting a limited amount of leakage of the sealed off liquid to gain access to and between the rubbing surfaces.

Having the above in view, the present invention has for an object to provide a fluid seal for moving shafts and the like, said seal comprising two members contacting with relative rubbing movement, but nevertheless with self-lubricating effect.

The invention has for a further object to provide a fluid seal for the stated purposes comprising two members contacting with relative rubbing movement, one said member being of rigid solid but soft material having inherent lubricating qualities, and the other said member being of flexible or elastic material, which, by friction of its rubbing contact with said first mentioned member will take up therefrom some of the material thereof and coat itself with such received material, whereby to form a friction reducing film, while nevertheless maintaining inviolate the cooperative sealing effect of said members.

The invention has for another object to provide a fluid seal of the kind and for the purposes mentioned, wherein the members contacting with relative rubbing movement respectively comprise one made of solid graphite and the other of flexible or elastic material such as leather, rubber or other elastomer.

Other objects of this invention, not at this time more particularly enumerated, will be understood from the following detailed description of the same.

Various illustrative embodiments of fluid seals made according to the present invention are shown in the accompanying drawings, in which—

Fig. 1 is a longitudinal sectional view of a fluid seal structure, embodying the principles of this invention, which is adapted to seal a rotor and its shaft in a rotor housing.

Figs. 2 to 5 inclusive are respectively longitudinal sectional views of various forms of fluid seal structures according to the invention which are adapted to seal a rotating shaft in its bearing.

Fig. 6 is a longitudinal sectional view of a fluid seal structure, embodying the principles of this invention, which is adapted to seal a sliding or reciprocating shaft; and Fig. 7 is a fragmentary cross-sectional view, taken on line 7—7 in Fig. 6.

Similar characters of reference are employed in the above described views, to indicate corresponding parts.

The novel sealing means against fluids according to this invention makes use of the high coefficient of friction of flexible or resilient materials, such as leather, rubber and various elastomers, when placed in rubbing contact with a rigid solid but soft material having inherent or self-lubricating qualities, such e. g. as graphite. When such materials are associated in mutual contact with relative rubbing movement, as e. g. when a body of rigid solid but soft graphite is rubbed against a body of flexible or resilient soft rubber or the like, the initial rubbing movement will be accompanied by comparatively high friction. As, however, the rubbing movement continues, the rubber or the like will take up some of the graphite substance of the engaged graphite body, which will thereupon coat the surface of the rubber or like body which moves in contact with said graphite body, forming on such surface a thin graphite film which, by reason of its inherent lubricating qualities, functions to very effectively lubricate the meeting surfaces of the two bodies which are in rubbing contact, thereby reducing friction to a negligible amount, while at the same time, the graphite film received by and coating the surface of the rubber or other body protects both itself and the graphite body from rapid wear and undue heating.

Seals embodying the principles of this invention as above briefly outlined have been found to perform with as great efficiency in sealing off dry air and gases generally, as in sealing off lubricating and other oils, hydrocarbons, antifreeze solutions, refrigerants and various other liquids; and in all cases such seals operate throughout a long use life without excessive wear or damage to either body member thereof. Furthermore, in producing seal structures according to this invention extraordinary precision methods are not necessary, since only ordinary precautions, tolerances and finishes need be exercised to obtain exceedingly satisfactory performance, for the meeting surfaces, when service of a seal structure is initiated, will quickly wear to an exact fit. For these reasons, seal structures of this invention can be very economically and rapidly produced by mass production methods, and yet a commercial product affording a high standard of service and performance will be assured.

It will be obvious that seal structures within the principles and scope of this invention may be made in many different forms and of various detail construction. For the purpose of illustration, but not by way of limitation, some illustrative forms of seal structures according to this invention have been shown in the drawings.

Referring to Fig. 1 of the drawings, a seal structure suitable for sealing off a fluid between a rotor 10 and a rotor housing 11 is shown. Secured to the rotor housing 11 is a hub cap 12 through which the rotor shaft 13 extends. Suitably secured to the end face of the hub 14 of the rotor 10 and around the rotor shaft 13, so as to rotate with these parts, is a resilient seal seating ring 15 which is made of rubber or other suitable elastomer. Opposed to said seal seating ring 15, so as to be engaged thereby with relative rubbing movement, is a sealing ring 16 made of rigid solid but soft graphite. Mounted around the shaft 13, between the end wall of the hub cap 12 and the graphite sealing ring 16, is an expandible bellows 17 having end flanges 18 and 19. The bellows flange 18 abuts the end wall of the hub cap 12, and may be suitably adhered or bonded thereto. Said graphite sealing ring 16 is bonded to the face of the bellows flange 19. A compression spring 20 is mounted around the bellows 17 between its flanges 18 and 19, whereby to exert a constant thrusting pressure adapted to urge the graphite sealing ring 16 into constant rubbing contact with the rubber seating ring. If desired, the face of the graphite sealing ring 16 which is opposed to and contacts with the face of the rubber seal seating ring 15 may be provided with annular concentrically spaced grooves or channels 21 to reduce the area of surface contact. As the rotating rubber seal seating ring 15 rubs against the non-rotating graphite sealing ring 16, the contacting face portions of the former will take up some of the graphite material from the latter, so as to accumulate a lubricating film of graphite in accordance with the principles and with attainment of the above stated advantages of this invention. Fluid gaining access to the interior of the hub cap 12, externally of the bellows 17 is trapped between the latter and the walls of the former, and is sealed off against escape along the exteriorly projection portion of the rotor shaft by the engaged graphite sealing ring 16 and rubber seal seating ring 15.

In Fig. 2 is shown a seal structure embodying this invention adapted to seal a rotating shaft 30 in its bearing 31, the latter having a ballbearing 32 or similar type of anti-friction bearing for supporting said shaft 30. Suitably secured to the bearing 31 is an end cap 33 through which the shaft 30 projects, and supported by said end cap 33, so as to be exposed at its inner side within the bearing interior, is a seal seating ring 34, which is made of rubber or other suitable elastomer. Opposed to said seating ring 34, so as to be engaged thereby with relative rubbing movement, is a sealing ring 35 made of rigid solid but soft graphite. Mounted on and around said shaft 30 is an expandible bellows 36 having at its inner end an internal base flange 37, which surrounds and tightly hugs the shaft 30 so as to rotate therewith. Said bellows is provided at its outer or free end with an external flange 38, to which the graphite sealing ring 35 is bonded so as to rotate with the bellows and shaft. A compression spring 39 is mounted around the bellows 36 between a holder 40, which rotates with the shaft, and the external flange 38 of said bellows, whereby to urge the graphite sealing ring 16 into constant rubbing contact with the rubber seal seating ring; the lubrication of the meeting surfaces being attained by a graphite film deposited from the graphite sealing ring upon the seal seating ring in accordance with the principles of this invention. Fluid seeking to escape outwardly from the bearing will be trapped between the bellows 36 and the bearing walls, and is sealed against escape along the exteriorly projecting portion of the shaft 30 by the engaged graphite sealing ring 35 and rubber seal seating ring 34.

In Fig. 3 is shown another form of seal structure according to this invention adapted to seal a rotating shaft 30 in its bearing 31, the latter having an outwardly open chamber 50 through which the shaft extends. Suitably fixed on the shaft 30, so as to rotate therewith, is seal seating ring 51, which is made of rubber or other suitable elastomer. Opposed to said seal seating ring 51, so as to be engaged thereby with relative rubbing movement, is a sealing ring 52 made of rigid solid but soft graphite. Surrounding the shaft 30 within the bearing chamber 50 is an expandable bellows 53 having at its outer end an externally projecting annular flange 54 which laps the external end face of the bearing 31, being secured to the bearing by a retaining ring 55 adapted to be affixed therewith to the bearing by suitable fastening means, such e. g. as the screws 56. At its inner end, said bellows 53 terminates in an internal annular flange 57 to which the graphite sealing ring 52 is bonded. A compression spring 58 is mounted around the shaft 30 and within the bellows 53 between a seating portion 59 with which said retainer ring 55 is provided and the internal annular flange 57 of said bellows, whereby to urge the graphite sealing ring 52 into constant rubbing contact with the rotating seal seating ring 51, the lubrication of the meeting surfaces being attained by a graphite film deposited from said graphite sealing ring upon the seal seating ring in accordance with the principles of this invention. Fluid seeking to escape outwardly from the bearing will be trapped between the bellows 53 and the walls of the bearing chamber 50, and is sealed against escape along the exteriorly projecting portion of the shaft 30 by the engaged graphite sealing ring 52 and the seal seating ring 51.

Referring to Fig. 4, the same shows a somewhat simpler form of seal structure which still embodies however the principles of this invention. This form of seal structure is also adapted to seal a rotating shaft 30 in a bearing 31, the latter having an outwardly open chamber 60 through which the shaft extends. Fixed on the shaft 30 within the bearing chamber 60, so as to rotate therewith, is a gripper ring 61, which may be made of rubber or other suitable elastomer, and bonded to the external circumference of said gripper ring 61, so as to rotate therewith and with the shaft 30, is a sealing ring 62 made of rigid solid but soft graphite. Supported by a metallic casing 63 which is fixed within the bearing chamber 60 is a wiper ring 64 made of flexible material, such as leather, rubber or other suitable elastomer. Said wiper ring 64 is bonded or otherwise suitably affixed to the casing 63. Said wiper ring and its casing are retained within the bearing chamber 60 by an annular retainer plate 65, which in turn is affixed to the bearing 31 by suitable fastening means, such e. g. as the screws 66. Said wiper ring is disposed in concentric relation to and around the sealing ring 62, and said wiper ring is provided with an angularly projecting tapered and flexible contact lip 67 which, by its resilient flexibility, is caused to bear against the external circumference of the sealing ring 62 with relative rubbing movement. The lubrication of the thus engaging surface of said contact lip 67 is attained by a graphite film deposited thereupon from the graphite sealing ring 62 in accordance with the principles of this invention. Fluid seeking to escape outwardly from the bearing will be trapped behind the wiper ring 64, and is sealed against escape along the exteriorly projecting portion of the shaft 30 by the engagement of the contact lip 67 of the wiper ring with the sealing ring 62.

In Fig. 5 is shown another form of seal structure similar to that shown in Fig. 4, except that the wiper ring means is of double form providing a pair of oppositely extending flexible contact lips 67 and 67' which engage the sealing ring 62 with double or compound sealing effect.

In Figs. 6 and 7 is shown a seal structure embodying the invention which is suitable for sealing off a fluid between a sliding or reciprocating shaft or piston rod 70 and a bearing gland 71 through which it moves. The bearing gland 71 is provided with an outwardly open gland chamber or throat 72 through which the shaft or piston rod extends. That portion of the shaft or piston rod 70 which reciprocally slides through the bearing gland 71 is provided with a covering sleeve 73 made of rubber or other suitable elastomer; said covering sleeve being bonded or adhered to the shaft or piston rod. Mounted within the gland chamber or throat 72, so as to abut its inner end wall, is a sealing ring 74 made of rigid solid but soft graphite; said sealing ring being thus disposed to surround the rubber sleeve covering of the shaft or piston rod. Said sealing ring 74 comprises a plurality of segments 75 joined end to end by lap joints 76. At its outer side or face, the sealing ring 74 thus formed is provided with an annular tapered or conical male camming face 77. Also mounted in the gland chamber or throat 72, so as to loosely surround the rubber covered portion of the shaft or piston rod, is a compressor ring 78 having an inverted tapered or conical female camming face 79 to thrustingly engage the male camming face 77 of the sealing ring 74. Threaded into the open end of the gland chamber or throat 72 is a gland nut 80. A compression spring 81 is mounted around the shaft or piston rod between said gland nut 80 and said compressor ring 78, whereby to urge the latter against the sealing ring 74 in a manner adapted to contract said sealing ring into a closely hugging relation to the rubber covering sleeve 73 of the shaft or piston rod, whereby to induce relative rubbing contact between the meeting surfaces thereof. Lubrication of the shaft or piston rod is attained by a graphite film deposited from the graphite sealing ring upon the external surfaces of the rubber covering sleeve 73 of the shaft or piston rod in accordance with the principles of this invention. Fluid seeking to outwardly escape through the bearing gland is sealed against escape along the shaft or piston rod by the engaged graphite sealing ring 74 and the rubber covering sleeve 73 of the shaft or piston rod.

Having now described my invention, I claim:

1. A fluid seal for a rotating shaft provided by two members adapted to contact with relative rubbing movement, one said member being affixed to the shaft to rotate therewith and the other member being stationary, means for constantly thrusting one said member in contact with the other, one said member comprising a body of rigid solid but soft graphite, and the other said member comprising a body formed from a soft elastomer.

2. A fluid seal for moving shafts and the like provided by two members contacting with relative rubbing movement and sealing effect, an expandible fluid impervious bellows by which one of said members is carried, compression spring means for expanding said bellows whereby to constantly thrust the member carried thereby in contact with the other member, one said member comprising a body of rigid but relatively soft graphite, and the other said member comprising a body formed from a soft elastomer.

3. A fluid seal for a rotating shaft provided by two members adapted to contact with relative rubbing movement, one of said members being adapted to rotate with the shaft and the other member being stationary, one of said members being carried by an expandible fluid impervious bellows, compression spring means for expanding said bellows whereby to constantly thrust the member carried thereby in contact with the other member, one of said members comprising a body of rigid solid but soft graphite, and the other said member comprising a body formed from a soft elastomer.

HOMER J. LOFTIS.

REFERENCES CITED

The following references are of record in the file of this patent:

UNITED STATES PATENTS

| Number | Name | Date |
| --- | --- | --- |
| 819,635 | Callan | May 1, 1906 |
| 1,912,926 | Wegener | June 6, 1933 |
| 2,023,206 | Olson | Dec. 3, 1935 |
| 2,075,769 | McCormack | Mar. 30, 1937 |
| 2,337,639 | Brummer | Dec. 28, 1943 |
| 2,408,314 | Jacobsen | Sept. 24, 1946 |